United States Patent
Basu et al.

(10) Patent No.: US 11,285,919 B2
(45) Date of Patent: Mar. 29, 2022

(54) SECURE LAYERED AUTONOMOUS VEHICLE ACCESS

(71) Applicant: GM Cruise Holdings LLC, San Francisco, CA (US)

(72) Inventors: Rajat Basu, San Francisco, CA (US); Jeffrey Brandon, Phoenix, AZ (US); Chase Kaufman, Fountain Hills, AZ (US)

(73) Assignee: GM Cruise Holdings, LLC, San Francisco, CA (US)

( * ) Notice: Subject to any disclaimer, the term of this patent is extended or adjusted under 35 U.S.C. 154(b) by 0 days.

(21) Appl. No.: 16/588,882

(22) Filed: Sep. 30, 2019

(65) Prior Publication Data

US 2021/0094511 A1    Apr. 1, 2021

(51) Int. Cl.
| | | |
|---|---|---|
| *B60R 25/30* | (2013.01) | |
| *G07C 9/00* | (2020.01) | |
| *H04W 12/06* | (2021.01) | |
| *H04W 12/63* | (2021.01) | |

(52) U.S. Cl.
CPC ........ *B60R 25/307* (2013.01); *G07C 9/00571* (2013.01); *G07C 9/00896* (2013.01); *H04W 12/06* (2013.01); *H04W 12/63* (2021.01); *B60R 2325/10* (2013.01); *B60R 2325/205* (2013.01); *B60R 2325/40* (2013.01)

(58) Field of Classification Search
None
See application file for complete search history.

(56) References Cited

U.S. PATENT DOCUMENTS

| | | | |
|---|---|---|---|
| 6,282,152 B1* | 8/2001 | Kurple | G04G 9/0064 340/12.28 |
| 9,256,852 B1* | 2/2016 | Myllymaki | B60P 3/007 |
| 10,732,629 B2* | 8/2020 | Ferguson | G01C 21/3453 |
| 2003/0117295 A1* | 6/2003 | Okada | B60R 25/24 340/12.23 |
| 2012/0299538 A1* | 11/2012 | Arai | H02J 7/0013 320/108 |
| 2017/0322555 A1* | 11/2017 | nikolic | G05D 1/0088 |
| 2018/0118164 A1* | 5/2018 | Wood | G05D 1/0088 |
| 2019/0047515 A1* | 2/2019 | Ferguson | G05D 1/0038 |
| 2019/0057342 A1* | 2/2019 | Ferguson | B60R 19/483 |
| 2019/0061686 A1* | 2/2019 | Neuhoff | B60R 25/24 |
| 2019/0066414 A1* | 2/2019 | Kowalewski | B60R 25/25 |
| 2019/0121357 A1* | 4/2019 | Zhang | H04L 67/12 |
| 2019/0138988 A1* | 5/2019 | High | G08G 5/0069 |
| 2019/0161058 A1* | 5/2019 | Lin | B60R 25/24 |
| 2019/0180354 A1* | 6/2019 | Greenberger | G07F 17/0057 |
| 2019/0226245 A1* | 7/2019 | Fabre | E05B 77/48 |
| 2019/0329691 A1* | 10/2019 | Crawford | B60P 3/20 |
| 2020/0139932 A1* | 5/2020 | Wood | B60R 25/30 |

\* cited by examiner

*Primary Examiner* — Curtis J King
(74) *Attorney, Agent, or Firm* — Polsinelli, PC (57) ABSTRACT

A vehicle having at least one vehicle access secured by a first lock and at least one secure area secured by a second lock. The vehicle may also have a receiver configured to receive a command from a remote computing system to unlock the vehicle access or the secure area.

17 Claims, 6 Drawing Sheets

SECURE LAYERED AUTONOMOUS VEHICLE ACCESS

TECHNICAL FIELD

The present technology relates to an autonomous vehicle with secure access and more particularly to enabling secured and layered access to different users.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

When a vehicle is used for ridesharing purposes, the vehicle is shared with and comes into contact with many different people with different roles, such as technicians, passengers, emergency services, etc. Human drivers use their judgment to determine when access should be granted to these different parties. However, autonomous vehicles lack a human driver; thus, it is challenging for the autonomous vehicle to grant access as needed to each of these different parties with varying needs of access.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

In general, a vehicle in a rideshare fleet will be shared and come in contact with many different people through its lifecycle. With a human driver, the driver decides who has access to the vehicle, how much access to the vehicle, how long the access is granted, etc. However, an autonomous vehicle is not able to make these decisions as easily. Moreover, in a rideshare setting, human drivers are able to easily authenticate who the passengers are and accordingly permit access to the vehicle. Again, it is challenging for autonomous vehicles to make these decisions easily.

In addition, throughout the life of the vehicle, the human driver may request assistance from a technician to repair or maintain the vehicle. On the other hand, an autonomous vehicle does not make this decision and is also unable to easily determine whether the person seeking access to the autonomous vehicle should be permitted to access, repair, and/or maintain the autonomous vehicle. For example, a human driver may simply call a tow truck or other emergency repair service and verify the person coming to help, but an autonomous vehicle is unable to make the same types of determinations as a human driver.

These issues are exacerbated when the vehicles are part of a fleet of vehicles. For example, it is a simple matter to hand over one pair of keys to one vehicle, but it becomes much more operationally difficult handling one hundred keys to one hundred vehicles. While one solution is to create keys that provide access to each and every vehicle, this solution may not be the best. Several security issues arise, such as losing one of these "master" keys, a user improperly uses these keys, etc.

Furthermore, an autonomous vehicle may require one or more secured areas in addition to a general area of the autonomous vehicle. There is a need for secure layered access to the various areas of the autonomous vehicle. For example, a passenger may not be allowed access to safety controls or the computer operating the autonomous vehicle. However, a technician may need access to these secured areas to provide proper maintenance and repairs to these critical systems. Thus, the above issue of operationally handling multiple vehicles is exacerbated by the issue of also varying levels of access to each of the vehicles.

Accordingly, there is a need for an efficient and easy-to-use solution that will allow secure and layered access to an autonomous vehicle. Furthermore, there is a need for an efficient and easy-to-use solution to enable secure and layered access to an autonomous vehicle in a fleet of vehicles.

Figure 1:
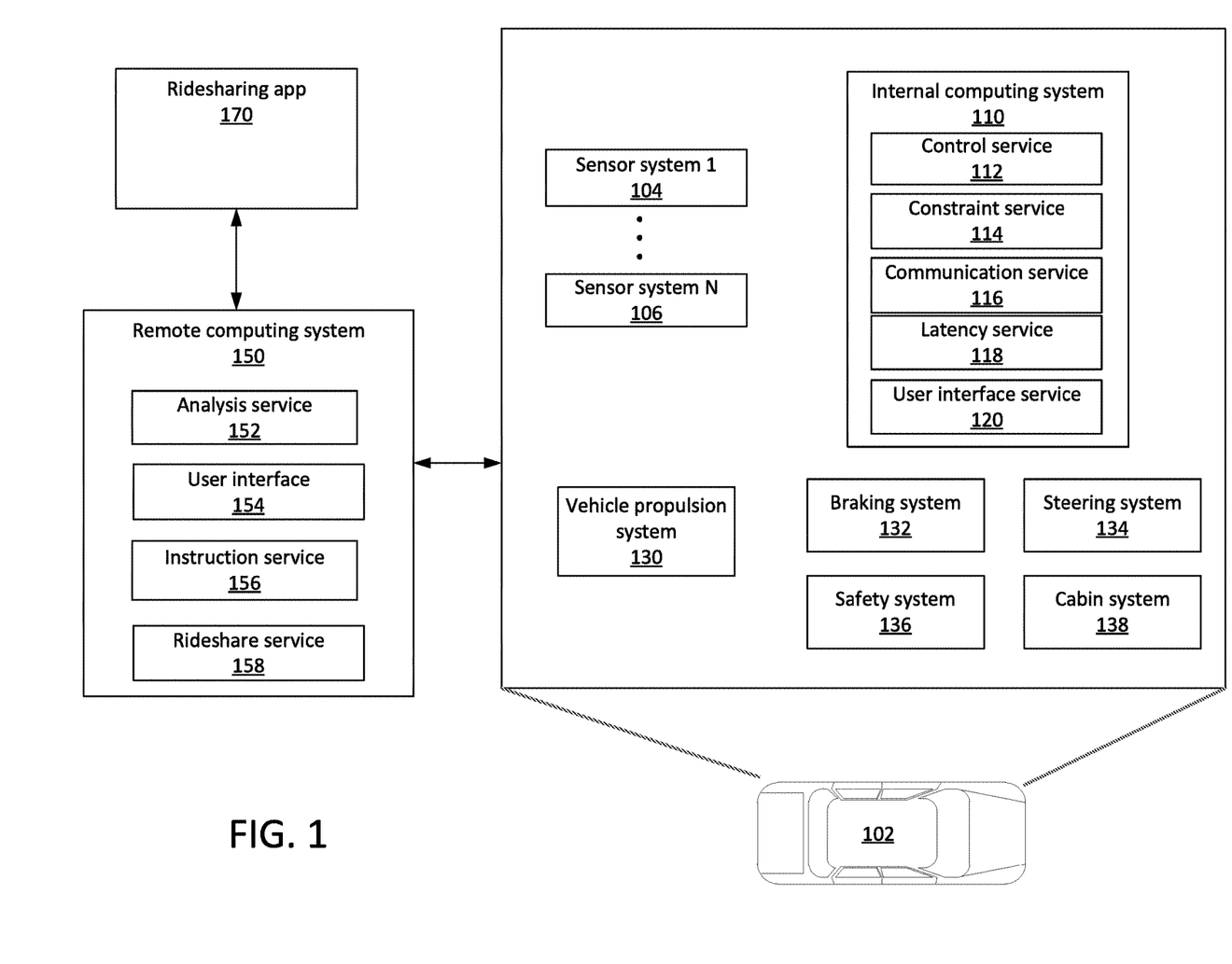
FIG. 1 shows an example of an example system for operating an autonomous vehicle in accordance with some aspects of the present technology.

With reference now to the figures, FIG. 1 illustrates an example of an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc. The internal computing system 110 may also be considered an autonomous driving system and/or an autonomous driving system computer.

The internal computing system 110 can include a control service 112 that is configured to control the operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102. In some embodiments, the control service 112 may also have a vehicle access subsystem configured to be initialized before an entirety of the internal computing system 110 is initialized. The vehicle access subsystem may be configured to unlock the at least one general area or access or the at least one secure area. Thus, the control service 112 may unlock various areas of the autonomous vehicle 102 without booting up the entirety of the internal computing system 110.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication. The communication service 116 may also be configured to communicate with the remote computing system 150 to authenticate requests and/or key codes received from users.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

Many of these systems, such as the internal computing system 110, may be critical to the operation and safety of the autonomous vehicle 102. Thus, these systems need to be secured in a secured area of the autonomous vehicle 102.

Figure 2:
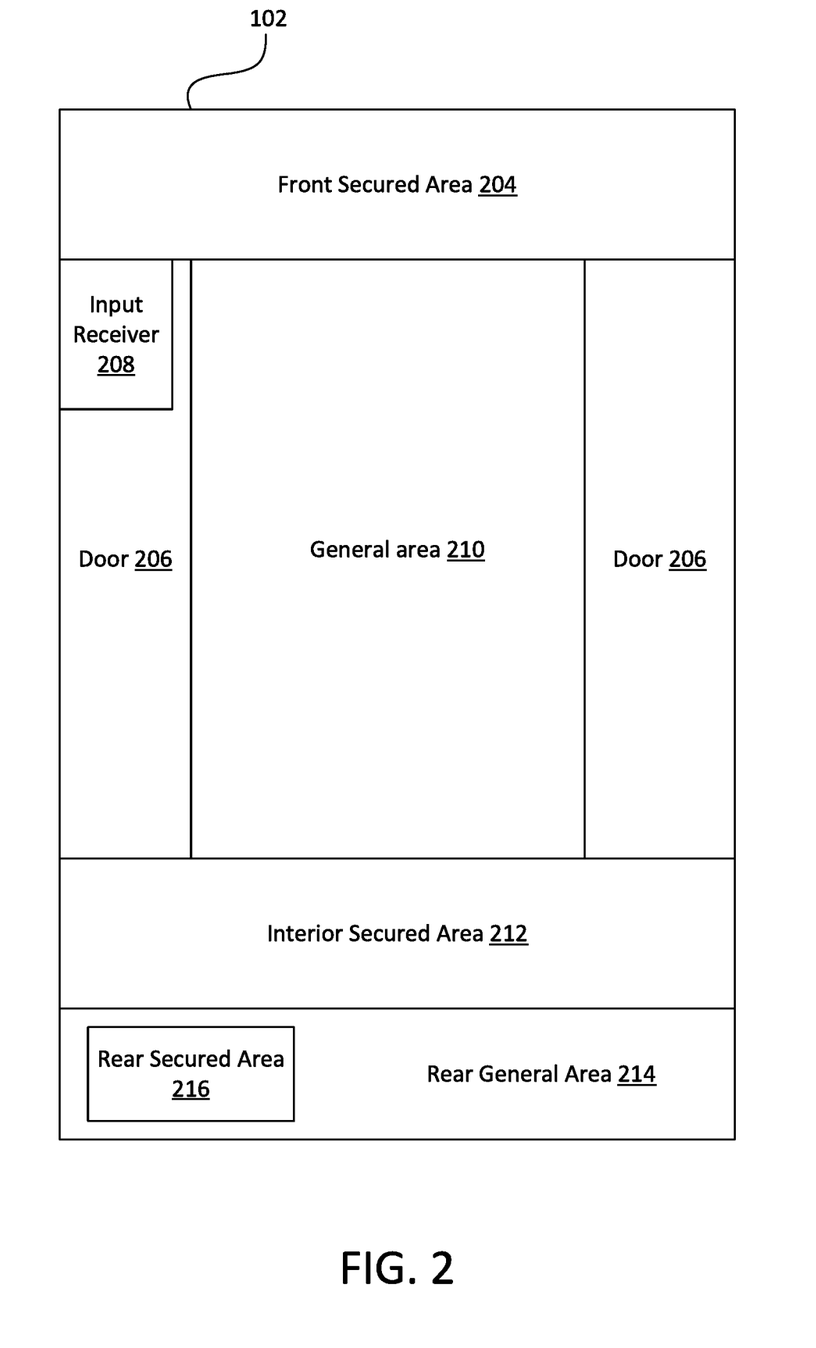
FIG. 2 is a block diagram showing various areas of an example of a vehicle in accordance with some aspects of the present technology.

FIG. 2 illustrates the autonomous vehicle 102 having a variety of access areas. Due to the variety of different access areas, these access areas maybe protected by varying levels of security and access may be restricted to different types interested parties. These areas may include, but are not limited to, a front secured area 204, doors 206, a general area or general access 210, an interior secured area 212, a rear general area 214, and a rear secured area 216. While described as front and rear areas, it is to be understood that the usage of the terms front and rear are for explanatory purposes only. In other words, these areas may be disposed in any place or position onboard the autonomous vehicle 102.

The front secured area 204 is an example of a secured area that is located on an outside of the autonomous vehicle 102. Due to its position outside of the autonomous vehicle 102, there is a high need for securing the front secured area 204. The front secured area 204 may be used to house a service panel and/or other similar mechanisms that can need maintenance. For example, the front secured area 204 may secure and provide secure layered access to fluid fill caps, heat, ventilation, air conditioning, etc. Because the front secured area 204 is located on the outside of the autonomous vehicle 102 and houses important mechanisms, the front secured area 204 needs to be well secured, yet accessible by maintenance personnel. To accomplish this, a first mechanical lock may be used to secure the front secured area 204 to control access thereto. Similarly, the autonomous vehicle 102 may have a customized mechanical fastener that is specific to autonomous vehicles 102 in the autonomous vehicle fleet. More specifically, the front secured area 204 may also be fastened or secured by the customized mechanical fastener. Accordingly, a customized physical tool may be used to loosen and/or remove the customized mechanical fastener on all or at least a plurality of the autonomous vehicles 102 in the autonomous vehicle fleet. In some embodiments, the front secured area 204 may be secured by a latch disposed in the interior secured area 212. Thus, the front secured area 204 may then only be accessed by technicians with access to the general area 210, the interior secured area 212, and the customized physical tool.

The doors 206 may be configured to lock and/or unlock as needed. The doors 206 may also be configured to have an input receiver 208. The input receiver 208 may be configured to receive an input from a user. For example, the input receiver 208 may be configured to receive a request to access the autonomous vehicle 102. Similarly, the input receiver 208 may be a keypad or other terminal to input a code that may be authenticated. Furthermore, the input receiver 208 may be a first electronic lock in communication with the internal computing system 110. The internal computing system 110 may then communicate with the remote computing system 150, which may authenticate any inputs received by the first electronic lock. Additionally, a second mechanical lock may also be used to secure the doors 206.

The general area 210 is an example of an interior area of the autonomous vehicle 102. The general area 210 may be suitable for passengers and other uses. The general area 210 may be secured by the doors 206 and the input receiver 208.

The interior secured area 212 may be located in an interior of the autonomous vehicle 102. For example, the interior secured area 212 may be located in the general area 210. The interior secured area 212 may be used to house an interior access panel or other similar mechanisms for providing controls of the autonomous vehicle 102. For example, the interior secured area 212 may secure and provide secure layered access to buttons that turn on the autonomous vehicle 102 and/or ports to connect wires for updating the autonomous vehicle 102. More specifically, the interior secured area 212 may house a vehicle control secure area that has physical controls that allow and/or are configured to provide limited human controller operation of the autonomous vehicle 102. Due to the sensitive nature of the systems and functions in the interior secured area, there is a need for restricting access to some users. To accomplish this, a second electronic lock may be used to secure the interior secured area 212. The second electronic lock may be in communication with the internal computing system 110, which is configured to communicate with the remote computing system 150. The remote computing system 150 may then authenticate any electronic keys that are used to unlock the second electronic lock. Furthermore, the second electronic lock may have or accept a different frequency from the first electronic lock to further distinguish and/or provide varying levels of access to different areas of the autonomous vehicle 102. Like the front secured area 204, the interior secured area 212 may also be secured by the customized mechanical fasteners. Thus, only technicians with access to the general area 210 and the customized physical tool may access the interior secured area 212.

The rear general area 214 may also be in an interior of the autonomous vehicle 102; however it may also be a separate area from the general area 210. The rear general area 214 may be configured for storage and other uses. Like the doors 206, the rear general area 214 may be secured by the input receiver 208. The rear general area 214 may be given access limitations similar to those of the doors 206 and the general area 210. More specifically, the rear general area 214 may have a third electronic lock in communication with the internal computing system 110, which may communicate with the remote computing system 150 to authenticate keys received by the third electronic lock. The third electronic lock may have and/or accept the same or a similar frequency as the first electronic lock, such that users who would be granted access to through the doors 206 to the general area 210 would also be granted access to the rear general area 214. In other words, a user having an electronic key that unlocks the doors 206 to enter the general area 214 may also access the rear general area 214 to store belongings.

The rear secured area 216 may be located in the rear general area 214. The rear secured area 216 may be used to house more systems and access panels. For example, the rear secured area 216 may house the internal computing system 110 for the autonomous vehicle 102 and/or other systems or ports. In other words, the rear secured area may have a computing system secure area where an autonomous driving system is housed. Due to the sensitivity of the systems and ports in the rear secured area 216, there is yet another need for restricting access to some users. More specifically, autonomous vehicle technicians would need access to the rear secured area 216, while passengers would not. Thus, the rear secured area 216 may also be secured by the customized mechanical fasteners so that only technicians with the customized physical tool may access the rear secured area 216. With more specificity, only technicians with access to the rear general area 214 and the customized physical tool may access the rear secured area 216.

Although discussed as front, rear, interior, and exterior areas, it is to be understood that the usage of these terms are merely for explanatory and illustrative purposes only. Thus, the positions of these areas may be in arranged in any combination of different layouts. Similarly, the functions of these various areas may be used interchangeably. For example, the front secured area 204 and the rear secured area 216 may be used to accomplish the purpose of the other.

Furthermore, the various electronic locks discussed are configured to unlock upon receipt of an authenticated key code or authenticated code. The authenticated key code may be provided through a mobile application on a mobile device of the user, the input receiver 208, and/or other similar methods capable of sending an electronic and authenticated key code. In some embodiments, the mobile application on the mobile device of the user may provide various levels of authentication based on an identity of the user. For example, the application may discern, based upon a profile of the user, that the user is a technician and/or a passenger. Thus, the application may provide an authenticated key code requesting and/or having appropriate levels of access to the various areas on the autonomous vehicle 102. In some embodiments, the mobile application on the mobile device may provide a higher level of access for users having specific identities (e.g. technicians) compared to the input receiver 208.

In other embodiments, a key fob may be configured to communicate the authenticated key code to the electronic locks. More specifically, the electronic locks may receive the authenticated key code and communicate the authenticated key code to the internal computing system 110. The internal computing system 210 may then authenticate the authenticated key code internally and accordingly control the electronic lock to unlock or remain locked. In other words, in some embodiments, the authentication may be conducted locally.

Figure 3:
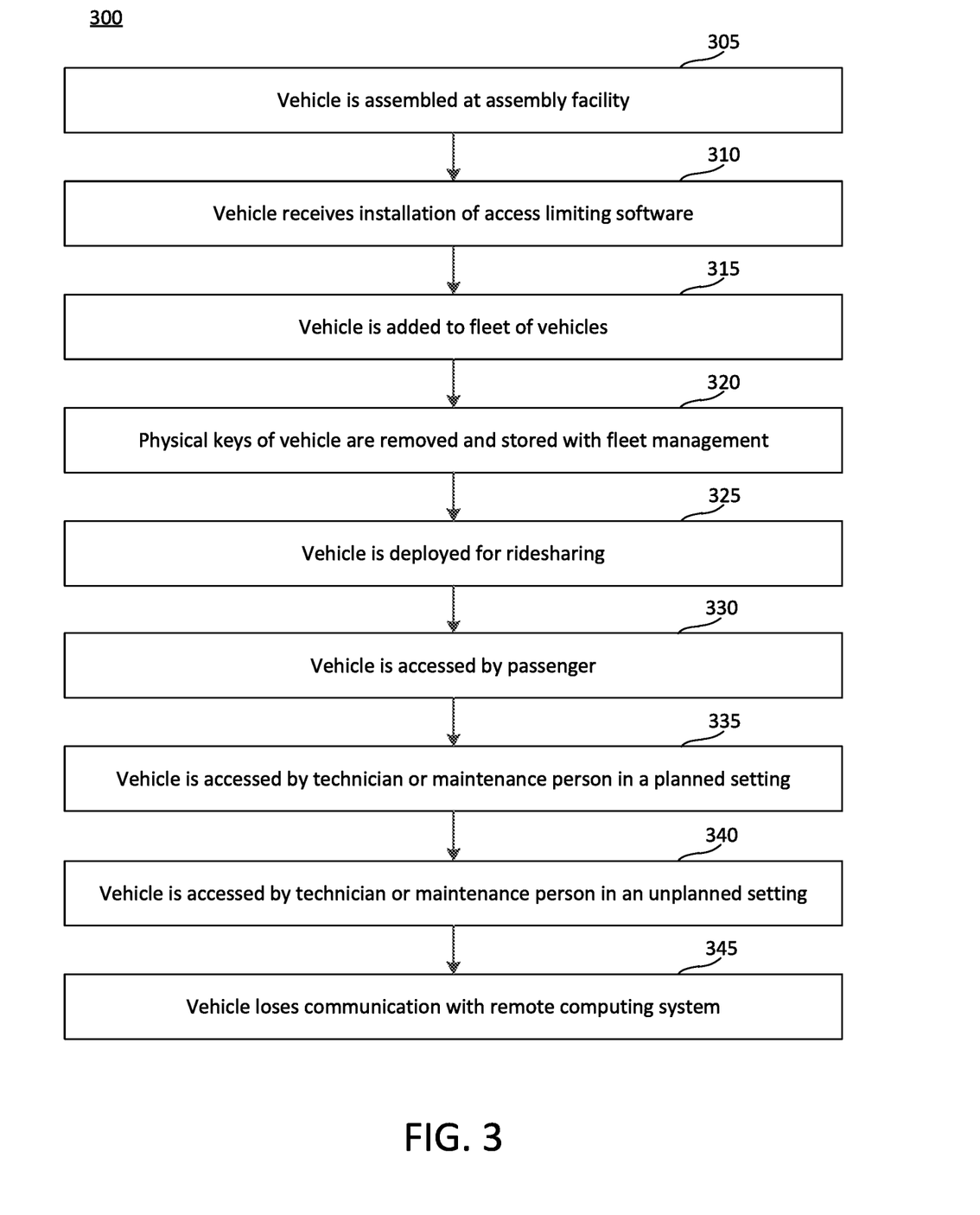
FIG. 3 is a flow diagram that illustrates an example of various points in time of a lifecycle of the vehicle in accordance with some aspects of the present technology.

FIG. 3 is a flow diagram that illustrates an example of various points in time of a lifecycle 300 of the vehicle in accordance with some aspects of the present technology.

At a high level, the autonomous vehicle 102 lifecycle 300 starts at step 305, where the vehicle is assembled at an assembly facility. During this time, the entire vehicle is open for access by anyone that is able to access the assembly facility. More specifically, without the access limiting software, the autonomous vehicle 102 grants full access to all areas therein. Furthermore, the autonomous vehicle 102 is assembled having all mechanical locks unlocked and without the electronic locks onboard and/or engaged. The autonomous vehicle 102 may also be accompanied by a physical key that is kept with the autonomous vehicle 102. Similarly, the key fob may also be stored with the physical key.

Next, at step 310, the autonomous vehicle 102 receives or has access limiting software or system firmware installed thereon. At this time the vehicle can now be locked and unlocked with a code or transmitter.

Before the vehicle is shipped from the assembly facility to an autonomous vehicle fleet facility, secure areas on the autonomous vehicle such as interior secured area 212, front secured area 204, and rear secure area 216 are physically secured, but other areas may not be.

Then, at step 315, the autonomous vehicle 102 is added to an autonomous vehicle fleet, and at step 320, a physical key that unlocks the mechanical locks of the autonomous vehicle 102 is removed from the autonomous vehicle and is stored with a manager of the fleet. At this time, doors 206 and rear general area 214 are primarily opened using a code, or transmission.

Step 325 then demonstrates the autonomous vehicle 102 being deployed for shared usage or for ridesharing.

Accordingly, step 330 demonstrates the autonomous vehicle 102 being accessed by a passenger in a rideshare setting.

Eventually, at step 335, the autonomous vehicle 102 would need to be accessed by a technician or maintenance person for planned maintenance or repairs.

In some cases, as demonstrated by step 340, the autonomous vehicle 102 would need to be accessed by a technician or maintenance person for unplanned maintenance or repairs.

In some cases, as demonstrated by step 345, the autonomous vehicle 102 may lose communication with the remote computing system 150.

With more specificity now, the autonomous vehicle 102 may limit or control access thereto differently at each of these various steps.

At step 305, the autonomous vehicle 102 is assembled at the assembly facility. Again, without the access limiting software, the autonomous vehicle 102 grants full access to all areas therein. More specifically, the autonomous vehicle 102 is assembled having all mechanical locks unlocked and without the electronic locks onboard and/or engaged. Furthermore, the physical key is associated with the autonomous vehicle 102. In other words, the physical key acts as a redundant unlocking mechanism and is created to unlock the mechanical locks of the autonomous vehicle 102. For security and logistical purposes, the physical key may be stored within the interior secured area 212 of the autonomous vehicle 102.

At step 310, the autonomous vehicle 102 receives and/or installs access limiting software or system firmware. In other words, the electronic locks of the autonomous vehicle 102 are created and/or engaged to provide layered access to the various areas of the autonomous vehicle 102. More specifically, the remote computing system 150 sends the software to the internal computing system 110 of the autonomous vehicle 102, where the software is then installed. The software may be sent over the air through the communication service 116 or by various other methods, such as USB. The software or system firmware may be in the form of a non-transitory computer readable medium storing instructions thereon. After installation of the access limiting software, the internal computing system 110 is configured to communicate receipts of electronic keys from users to the remote computing system 150. Furthermore, the internal computing system 110 is also configured to receive communications from the remote computing system 150 containing instructions to unlock electronic locks and/or control access through the electronic locks to the various areas of the autonomous vehicle 102. In other words, the internal computing system 110 is configured to receive and communicate the authenticated key code to the remote computing system 150, which authenticates and returns the authenticated key code and/or instructions to control the various areas of the autonomous vehicle 102.

At step 315, the autonomous fleet 102 is introduced and added to the autonomous vehicle fleet. In some embodiments, the autonomous vehicle 102 is then connected to the remote computing system 150 through the communication service 116 and physical connections to the remote computing system 150 are removed. In some embodiments, the authenticated key code is now integrated into the mobile application of the mobile device of the users.

At step 320, the physical key is removed from the interior secured area 212 of the autonomous vehicle 102 and stored with the manager of the fleet. The interior secured area 212 is then locked using the authenticated key code with the internal computing system 110 and/or the remote computing system 150.

At step 325, the autonomous vehicle 102 is deployed for ridesharing usage. The electronic locks onboard the autonomous vehicle 102 are now engaged and locked. More specifically, the electronic locks are locked and in communication with the internal computing system 110 to receive requests from users. In other words, the electronic locks are locked and waiting for instructions from the autonomous vehicle 102 and/or the remote computing system 150 to unlock for users.

At steps 330, 335 and 340, the autonomous vehicle 102 receives requests from users having various identities, such as that of a passenger, an authenticated technician or maintenance person, an unauthenticated technician or maintenance person, etc. In these steps 330, 335, 340, the general areas 210, 214 and the secured areas 204, 212, 216 are locked. As will be discussed in further detail below, upon receipt of an authenticated key code with appropriate levels of access, the autonomous vehicle 102 will communicate with the remote computing system 150, which will instruct the autonomous vehicle 102 to unlock the appropriate areas. In other words, the autonomous vehicle 102 communicates with the remote computing system 150 to determine an appropriate level of access to provide and/or grant to the users.

At step 345, the autonomous vehicle 102 loses communication with the remote computing system 150. Because the autonomous vehicle 102 cannot communicate with the remote computing system 150, the autonomous vehicle 102 may not be able to verify or authenticate the authenticated key codes. Thus, the autonomous vehicle 102 may be unable to control the electronic locks, resulting in restricted access to all or at least a plurality of areas on the autonomous vehicle 102. To remedy this, the manager of the fleet may then utilize the physical key to access and recover the autonomous vehicle 102. More specifically, the physical key may provide access to one of the secured areas 204, 212, 216, which may house the internal computing system 110 and the control service 112. Therefore, the manager of the fleet may allow a technician to access and control the autonomous vehicle 102 with the physical key.

Figure 4:
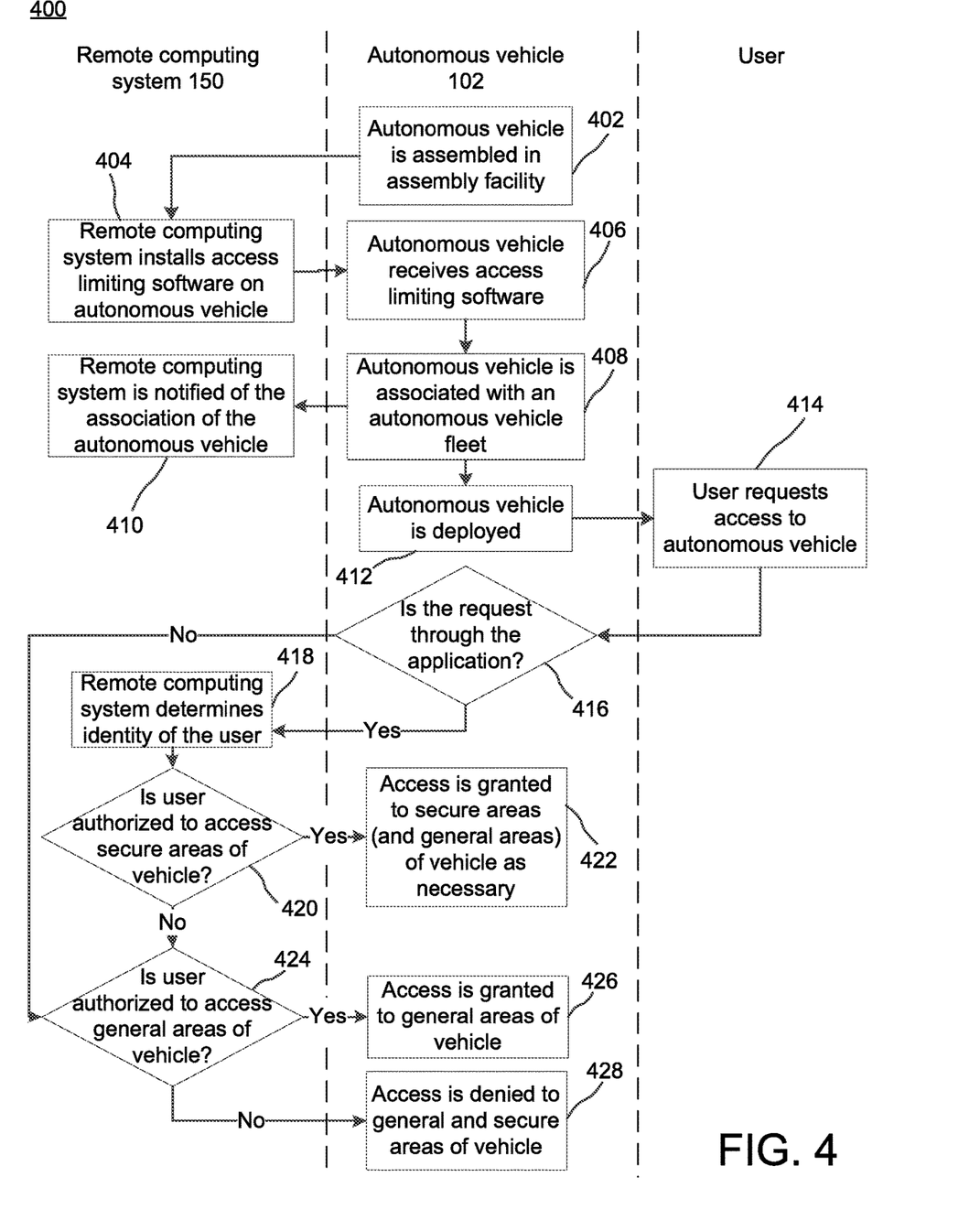
FIG. 4 is a swimline diagram that illustrates a process for layering secure access to a vehicle in accordance with some aspects of the present technology.

FIG. 4 is a swim lane flow diagram that illustrates a process 400 for layering secure access to the autonomous vehicle 102.

At step 402, the autonomous vehicle 102 is assembled at the assembly facility. As discussed above, the autonomous vehicle 102 is assembled with full access granted to all areas of the autonomous vehicle 102.

At step 404 and 406, the remote computing system 150 installs access limiting software onto the autonomous vehicle 102. As discussed above, the autonomous vehicle 102 may then be configured to receive requests with electronic keys to identify whether the autonomous vehicle 102 should grant access to the various areas of the autonomous vehicle 102.

At step 408, the autonomous vehicle 102 is associated with an autonomous vehicle fleet.

At step 410, the remote computing system 150 is then notified of the association. In some embodiments, the remote computing system 150 may be the entity associating the autonomous vehicle 102 with the autonomous vehicle fleet, so the remote computing system 150 may not need to be notified.

At step 412, the autonomous vehicle 102 is deployed for use. The remote computing system 150 may also cause the autonomous vehicle 102 to engage the electronic locks.

At step 414, the autonomous vehicle 102 receives a request from a user to access the autonomous vehicle 102.

At step 416, the autonomous vehicle 102 then sends the request to the remote computing system 150, which receives the request. The remote computing system 150 and/or autonomous vehicle 102 may determine whether the request was sent through the mobile application. In some embodiments, the autonomous vehicle 102 may send the request to the remote computing system 150, which may determine whether the request was sent through the application on the mobile device of the user. In some embodiments, the request may also include a vehicle identifier when the request is sent from an employee of a maintenance facility. This may help the remote computing system 150 determine which autonomous vehicle 102 the user is attempting to access.

If the autonomous vehicle 102 and/or the remote computing system 150 determines that the request was sent through the mobile application, the process 400 continues to step 418. At step 418, the remote computing system 150 then determines the identity of the user. As discussed above, the identity of the user may provide information as to what level of access the remote computing system 150 should grant the user. In some embodiments, the remote computing system 150 may authenticate the request. The authentication of the request may also be based upon a profile of the user, which may identify the user as a passenger, an employee of a maintenance facility, a technician, and/or other types of roles. In some embodiments, the remote computing system 150 may then send the authentication and/or the determination of the identity and/or a determined appropriate level of access to the autonomous vehicle 102, which receives the information.

At step 420, the remote computing system 150 uses the determined identity of the user to determine whether the user is authorized to access the secure areas 204, 212, 216 of the autonomous vehicle 102. In some embodiments, the remote computing system 150 sends the determined identity of the user to the autonomous vehicle 102 so that the autonomous vehicle 102 may determine whether the user is authorized to access the secure areas 204, 212, 216 of the autonomous vehicle 102. In some embodiments, the remote computing system 150 may also determine a location of the user and/or the mobile device of the user. The remote computing system 150 may use the location of the user and/or the mobile device of the user to determine that the user is authorized to access the secured areas 204, 212, 216. For example, the remote computing system 150 may determine that the request is sent from a user in a maintenance facility. Thus, the user is likely to be an employee of the maintenance facility and should be granted access to the secured areas 204, 212, 216.

If the remote computing system 150 determines that the user is authorized to access the secure areas 204, 212, 216 of the autonomous vehicle 102, then the process 400 continues to step 422. At step 422, the remote computing system 150 notifies the autonomous vehicle 102 and instructs the internal computing system 110 to allow access to the secure areas 204, 212, 216 and the general areas 210, 214 as needed.

If the remote computing system 150 determines that the user is not authorized to access the secure areas 204, 212, 216 of the autonomous vehicle 102, then the process 400 continues to step 424. At step 424, the remote computing system 150 determines whether the user is authorized to access the general areas 210, 214. When the request is through the mobile application, the remote computing system 150 may use the determined identity of the user to determine whether the user is authorized to access the general areas 210, 214.

If the remote computing system 150 determines that the user is authorized to access the general areas 210, 214, then the process 400 continues to step 426. At step 426, the remote computing system 150 notifies the autonomous vehicle 102 and instructs the internal computing system 110 to allow access to the general areas 210, 214 as needed.

If the remote computing system 150 determines that the user is not authorized to access the general areas 210, 214 then the process 400 continues to step 428. At step 428, the remote computing system 150 notifies the autonomous vehicle 102 and instructs the internal computing system 110 to deny access to the general areas 210, 214 and the secure areas 204, 212, 216.

Referring back to step 416, if the remote computing system 150 and/or the autonomous vehicle 102 determine that the request was not sent through the mobile application, the process 400 continues to step 424. As discussed above, at step 424, the remote computing system 150 determines whether the user is authorized to access the general areas 210, 214. When the request is not through the mobile application, the remote computing system 150 may determine from an input received with the request whether the user is authorized to access the general areas 210, 214. More specifically, the remote computing system 150 may verify and/or authenticate the input received with the request to determine an appropriate level of access to grant the user. For example, if the user input credentials that match a code sent from the remote computing system 150 for a ridesharing passenger, then the remote computing system 150 may verify that the input matches the code and the user is the ridesharing passenger. Accordingly the remote computing system 150 may then determine to grant the user access to the general areas 210, 214. From step 424, the process 400 continues as described above.

It is further contemplated that when the autonomous vehicle 102 allows or rejects access to any of the general areas 210, 214 and/or the secured areas 204, 212, 216, a log file may be created or updated. Similarly, the log file may include all requests to unlock at least one of the secured areas 204, 212, 216. The log file may be stored on the remote computing system 150.

In some embodiments, the manager of the fleet may set or enable the remote computing system 150 to automatically grant access to any specific combination of the secured and general areas when the autonomous vehicle 102 is in the maintenance facility. In other words, the employee of the maintenance facility need not initiate or request access prior to physically accessing the areas that they are authorized to access.

Figure 5:
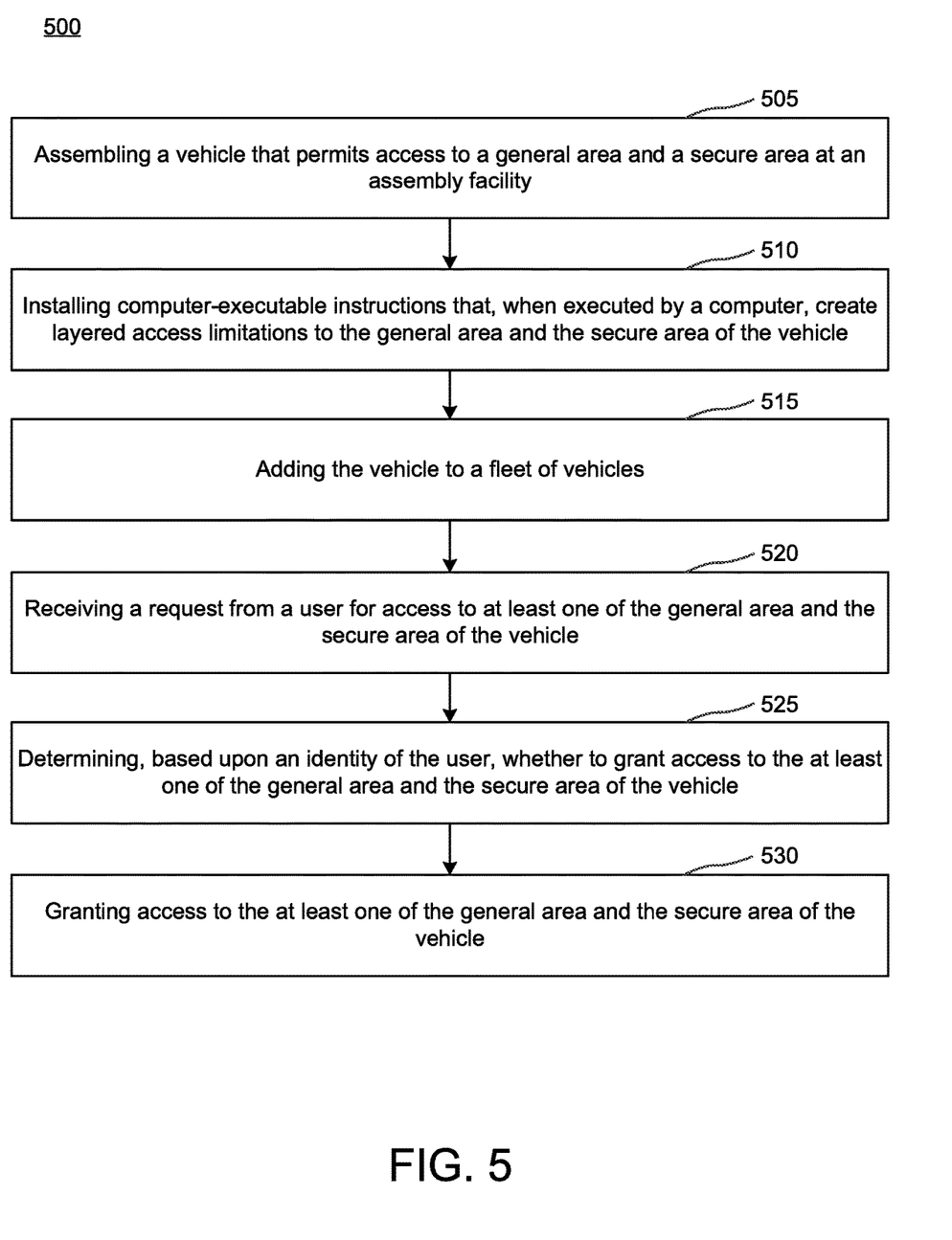
FIG. 5 illustrates an example sequence of steps for layering secure access to a vehicle in accordance with some aspects of the present technology.

FIG. 5 illustrates an example sequence 500 of steps for layering secure access to the autonomous vehicle 102.

At step 505, the autonomous vehicle 102 is assembled, such that the autonomous vehicle 102 permits access to the general areas 210, 214 and the secured areas 204, 212, 216 when the autonomous vehicle 102 is at the assembly facility.

At step 510, computer-executable instructions are installed onto the autonomous vehicle 102. When executed by a computer, the computer-executable instructions creates layered access limitations to the general areas 210, 214 and the secured areas 204, 212, 216 of the autonomous vehicle 102.

At step 515, the autonomous vehicle 102 is added to a fleet of autonomous vehicles 102.

At step 520, a request is received from a user for access to at least one of the general areas 210, 214 and/or the secured areas 204, 212, 216 of the autonomous vehicle 102.

At step 525, the autonomous vehicle 102 and/or the remote computing system 150 determines, based upon an identity of the user, whether to grant access to the at least one of the general areas 210, 214 and/or the secured areas 204, 212, 216 of the autonomous vehicle 102.

At step 530, the autonomous vehicle 102 grants access to the at least one of the general areas 210, 214 and/or the secured areas 204, 212, 216 of the autonomous vehicle 102.

Figure 6:
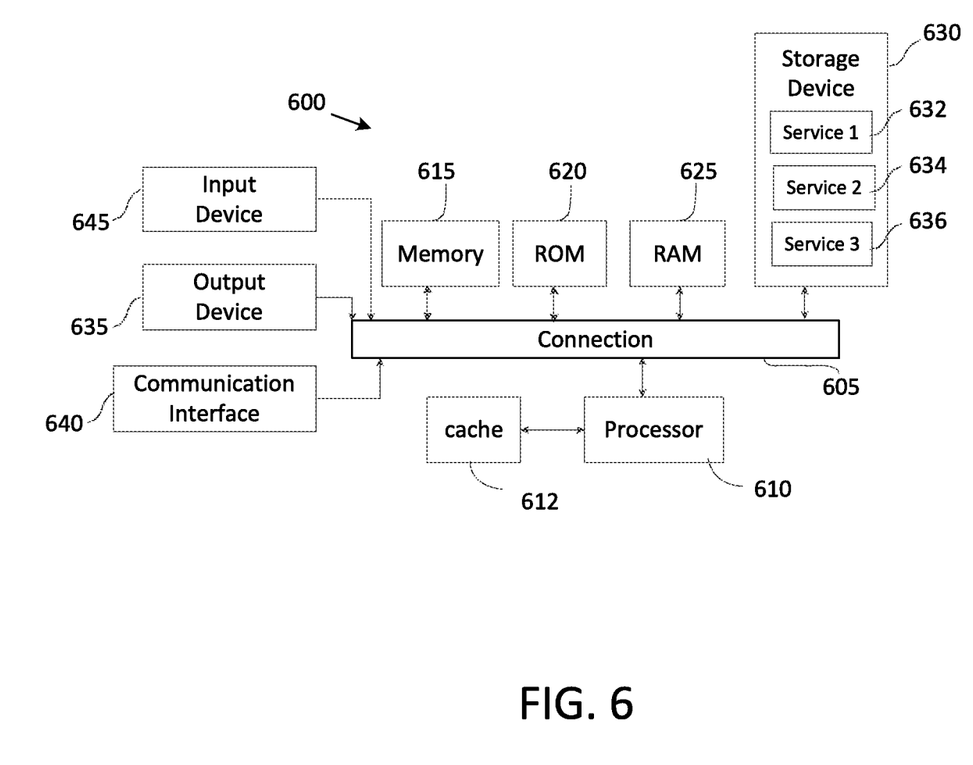
FIG. 6 shows an example of a system for implementing certain aspects of the present technology.

FIG. 6 shows an example of computing system 600, which can be for example any computing device making up internal computing system 110, remote computing system 150, (potential) passenger device executing rideshare app 170, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. An autonomous vehicle comprising:
at least one vehicle access secured by a first lock configured to unlock based on a first electronic key accepted via a first frequency, the at least one vehicle access providing access to the autonomous vehicle from outside of the autonomous vehicle;
at least one secure area secured by a second lock configured to unlock based on a second electronic key accepted via a second frequency, wherein the first lock cannot be unlocked using the second electronic key accepted via the second frequency, and wherein the second lock cannot be unlocked using the first electronic key accepted via the first frequency;
a receiver configured to receive a command from a computing system to unlock the vehicle access or the secure area via the first lock or the second lock;
a first physical unlocking key configured to unlock the first lock, the first physical unlocking key providing a redundant unlocking mechanism for the first lock in addition to the first electronic key; and
a second physical unlocking key configured to unlock the second lock, the second physical unlocking key providing a redundant unlocking mechanism for the second lock in addition to the second electronic key.

2. The autonomous vehicle of claim 1, comprising:
an autonomous driving system and a vehicle access subsystem, wherein the vehicle access subsystem is configured to be initialized before the autonomous driving system, whereby the autonomous vehicle can unlock the vehicle access or secure area without booting up an entirety of the autonomous driving system.

3. The autonomous vehicle of claim 2, wherein the at least one secure area includes a plurality of secure areas comprising:
a computing system secure area wherein the autonomous driving system is housed; and
a vehicle control secure area comprising physical controls configured to provide limited human controlled operation of the autonomous vehicle.

4. The autonomous vehicle of claim 1, further comprising:
at least one non-transitory computer readable medium storing instructions thereon; and
at least one processor;
wherein when executed, the instructions cause the at least one processor to: install system firmware for layered access to the autonomous vehicle.

5. The autonomous vehicle of claim 1, wherein the autonomous vehicle is one of a fleet of vehicles.

6. A system comprising:
an autonomous vehicle including:
at least one general access secured by a first lock configured to unlock based on a first electronic key accepted via a first frequency;
at least one secure area secured by a second lock configured to unlock based on a second electronic key accepted via a second frequency, wherein the first lock cannot be unlocked using the second electronic key accepted via the second frequency, and wherein the second lock cannot be unlocked using the first electronic key accepted via the first frequency;
a receiver configured to receive a command to unlock the at least one general access or the at least one secure area; and
a first physical unlocking key configured to unlock the first lock, the first physical unlocking key providing a redundant unlocking mechanism for the first lock in addition to the first electronic key; and
a second physical unlocking key configured to unlock the second lock, the second physical unlocking key providing a redundant unlocking mechanism for the second lock in addition to the second electronic key; and
a computing system configured to receive a receive a request to unlock the at least one general access or the at least one secure area, and to determine whether to send the command to unlock the general access or the secure area via the first lock or the second lock.

7. The system of claim 6 wherein the computing system is configured to store a log file including all requests to unlock the at least one secure area.

8. The system of claim 6 wherein the computing system is configured to determine a location of a device sending the request to unlock, and determining to unlock the at least one secure area when the vehicle is at a maintenance facility.

9. The system of claim 6 wherein the request to unlock includes a vehicle identifier when the request is sent from an employee of a maintenance facility.

10. The system of claim 6, comprising:
an autonomous driving system computer and a vehicle access subsystem, wherein the vehicle access subsystem is configured to be initialized before the autonomous driving system computer, whereby the autonomous vehicle can unlock the at least one general access or the at least one secure area without booting up an entirety of the autonomous driving system computer.

11. The system of claim 10, wherein the at least one secure area includes a plurality of secure areas comprising:
a computing system secure area wherein the autonomous driving system computer is housed; and
a vehicle control secure area comprising physical controls configured to provide limited human controlled operation of the autonomous vehicle.

12. The system of claim 6, wherein the autonomous vehicle is one of a fleet of vehicles.

13. A method comprising:
assembling a vehicle permitting access to a general area secured by a first lock configured to unlock based on a first electronic key accepted via a first frequency and a secure area secured by a second lock configured to unlocked based on a second electronic key accepted via a second frequency, wherein the first lock and the second lock are operable to unlock by at least one redundant physical unlocking mechanism, wherein the first lock cannot be unlocked using the second electronic key accepted via the second frequency, and wherein the second lock cannot be unlocked using the first electronic key accepted via the first frequency;
installing computer-executable instructions that, when executed by a computer, create layered access limitations to the general area by the first lock and the secure area by the second lock of the vehicle;
receiving a request from a user via the first frequency or the second frequency for access to at least one of the general area and the secure area of the vehicle, the request comprising at least one of the first electronic key or the second electronic key;
determining, based upon an identity of the user and the request, whether to grant access to the at least one of the general area and the secure area of the vehicle; and
granting access to the at least one of the general area and the secure area of the vehicle.

14. The method of claim 13, wherein when the identity of the user is a maintenance person with an authenticated code, access is granted to the secure area of the vehicle.

15. The method of claim 13, wherein when the identity of the user is a maintenance person without an authenticated code, access is granted to the general area of the vehicle.

16. The method of claim 13, wherein when the identity of the user is a passenger, access is granted to the general area of the vehicle.

17. The method of claim 13, wherein the vehicle is one of a fleet of vehicles.

* * * * *